(12) United States Patent
Bähr et al.

(10) Patent No.: US 7,737,585 B2
(45) Date of Patent: Jun. 15, 2010

(54) ELECTRIC MACHINE WITH IMPROVED WATER COOLING SYSTEM

(75) Inventors: Hubertus Bähr, Bad Königshofen (DE); Michael Zisler, Euerdorf-Wirmsthal (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/568,676

(22) PCT Filed: Apr. 29, 2005

(86) PCT No.: PCT/EP2005/051978
§ 371 (c)(1),
(2), (4) Date: Nov. 3, 2006

(87) PCT Pub. No.: WO2005/112228
PCT Pub. Date: Nov. 24, 2005

(65) Prior Publication Data
US 2007/0210655 A1    Sep. 13, 2007

(30) Foreign Application Priority Data
May 7, 2004 (DE) .................. 10 2004 022 557

(51) Int. Cl.
H02K 9/00 (2006.01)
(52) U.S. Cl. .......................... 310/54; 310/52
(58) Field of Classification Search ............ 310/54, 310/52; H02K 9/00
See application file for complete search history.

(56) References Cited

U.S. PATENT DOCUMENTS

| | | | |
|---|---|---|---|
| 3,727,085 A * | 4/1973 | Goetz et al. | 310/54 |
| 5,489,810 A * | 2/1996 | Ferreira et al. | 310/54 |
| 5,592,039 A * | 1/1997 | Guardiani | 310/113 |
| 5,616,973 A * | 4/1997 | Khazanov et al. | 310/54 |
| 5,859,482 A * | 1/1999 | Crowell et al. | 310/58 |
| 6,072,253 A * | 6/2000 | Harpenau et al. | 310/58 |
| 6,570,276 B1 * | 5/2003 | Morel et al. | 310/52 |
| 7,005,765 B1 * | 2/2006 | Schulz et al. | 310/54 |
| 2002/0047473 A1 | 4/2002 | Laurent et al. | |
| 2004/0169427 A1 * | 9/2004 | Hoppe | 310/54 |

FOREIGN PATENT DOCUMENTS

| | | |
|---|---|---|
| DE | 44 11 055 | 7/1997 |
| DE | 196 24 519 | 1/1998 |
| DE | 196 35 196 | 3/1998 |
| DE | 101 41 890 | 3/2003 |
| DE | 10141890 A1 * | 3/2003 |
| EP | 0 560 993 | 9/1993 |
| FR | 2 817 406 | 5/2002 |
| GB | 883 827 | 12/1961 |

OTHER PUBLICATIONS

English translation of DE 10141890 A1.*
Ballman et al (DE10141890, English translation).*
DE 10141890_EN.pdf : Ballmann et al (DE 10141890, English translation).*
DE 10141890_EN.pdf : Ballmann et al (DE 10141890, IDS) English translation.*

* cited by examiner

*Primary Examiner*—Quyen Leung
*Assistant Examiner*—John K Kim
(74) *Attorney, Agent, or Firm*—Henry M. Feiereisen; Ursula B. Day

(57) ABSTRACT

The aim of the invention is to provide a fluid-cooled electric machine in a simple manner. To achieve this, a housing (1) is configured in two parts, in such a way that each housing part (2, 3) comprises a bearing bracket (4, 5) and said housing parts are designed (2, 3) to form cooling channels once assembled.

7 Claims, 4 Drawing Sheets

ELECTRIC MACHINE WITH IMPROVED WATER COOLING SYSTEM

BACKGROUND OF THE INVENTION

The invention relates to an electrical machine, which has a housing, which has a stator with laminate layers, a rotor, whose shaft is mounted such that it can rotate via bearings positioned in bearing plates, and a liquid casing in the housing having meandering cooling channels.

In order to increase the power and torque, the principle of liquid or water cooling is used in electrical machines. In liquid-cooled electrical machines, in this case different principles of liquid cooling are used. The liquid permeates an extruded profile which is equipped with axial cooling channels, usually in the corner regions. The deflection of the liquid flow takes place in the separate bearing plates or by means of additional deflecting plates, which are fitted on the outside on the electrical machine.

Deflection in the bearing plates takes place by means of cast-in or drilled channels, and some of the tubes are also cast into the castings at the same time. Sealing at the bearing plates or deflecting plates takes place, owing to the construction, predominantly by means of surface sealing means, for example a flat gasket or fluids, and for this reason has an extremely complex design.

One further principle for cooling an electrical machine is inserting a cooling coil into grooves in the rear of the stator which are arranged in annular or meandering fashion. This results in complex fitting, and the heat transfer from the stator to the cooling coil is insufficient.

Furthermore, an arrangement of cooling collars around the housing of an electric motor is also known. The production of these cooling collars is very complex; the heat transfer from the heat sources of the electrical machine to the cooling collars is likewise extremely deficient.

SUMMARY OF THE INVENTION

Accordingly, the invention is based on the object of providing an electrical machine having liquid cooling which provides sufficient cooling in a simple manner given simple fitting of the individual parts.

In addition, the intention is to provide reliable sealing of the cooling cycle.

This object is achieved by an electrical machine having a housing, which has a stator with laminate layers, a rotor, whose shaft is mounted such that it can rotate via bearings positioned in bearing plates, a liquid cooling system in the housing with cooling channels, the housing having a two-part design such that each housing part has a bearing plate and the housing parts are designed such that the housing parts, when assembled, form these cooling channels.

Owing to the inventive design of the two bearing plates, a coolant flow is passed in the form of a coil or in meandering fashion around the stator, the number of sealing points to adjoining components being minimized. The comparatively effective thermal coupling to the stator results in an increase in the utilization of the electrical machine.

According to the invention, there is a reduction in the components of the housing, and no deflecting plates are required, as well as additional cooling coils or cooling collars. The fitting time for the electrical machine according to the invention is reduced owing to the omission of the comparatively complex surface sealing means, the fitting of the housing and possibly the cooling coils or cooling collars.

It is likewise superfluous to cast tubes into the bearing plates as well as to drill or cast the deflecting channels into the bearing plates.

Owing to the reduction in the sealing points and the changeover associated therewith from surface sealing to radially sealing O rings, higher pressures are possible in the cooling cycle, which in turn has a positive effect on the utilization of the electrical machine.

Owing to the design of the outer contour of the electrical machine as a cross profile, the corner regions are free, with the result that free access to fixing screws on the flange is possible from the rear of the electrical machine. A realization of round or octagonal outer contours is also possible, which likewise allow access to the fixing screws on the flange.

BRIEF DESCRIPTION OF THE DRAWING

The invention and further advantages in accordance with the dependent claims will be explained in more detail with reference to the schematically illustrated embodiments in the drawing, in which:

DETAILED DESCRIPTION OF PREFERRED EMBODIMENTS

Figure 1:
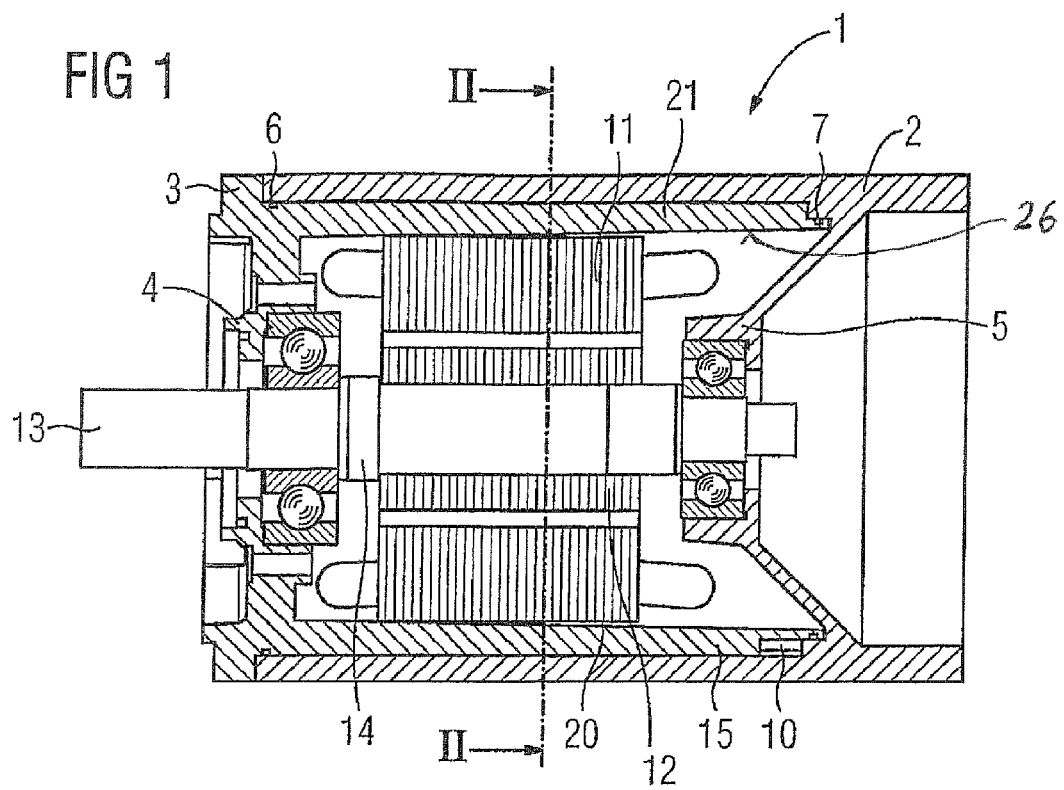
FIG. 1 shows a longitudinal section of a housing.

FIG. 1 shows, in a longitudinal section, a housing 1 according to the invention of an electrical machine having a stator 11 and a rotor 12. Two housing parts 2 and 3, which are pushed one inside the other in the manner of a tube, form the housing 1. Each housing part 2, 3 has in each case one bearing plate or bearing housing portion 5, 4, into which a bearing 9 is inserted and can be positioned by means of, for example, a collar 14. In this case, the collar 14 is preferably part of a shaft 13, but can also be fitted to the shaft 13 as an additional part. The shaft 13 bears a rotor 12. The housing part 2, 3 and the respective bearing plate 4, 5 preferably each have an integral design.

The sealing points provided between the housing parts 2 and 3 in the pushed-together state are sealed via O rings 6 and 7. The tube of the respective housing part 2, 3 extends axially over the stator 11, preferably even far over the respective end windings. In order to make it easier to fit the stator 11, the housing part 3 is advantageously designed to be slightly conical on its inner side 26. The cavity thus formed can be filled with thermally conducting materials in order to maintain sufficient thermal conductivity between the housing and the stator 11.

Figure 2:
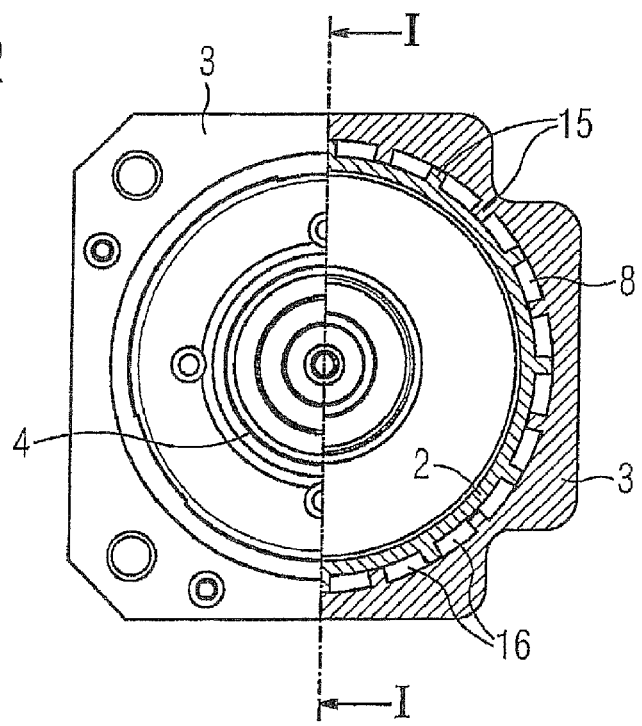
FIG. 2 shows a cross-sectional view of the housing.
Figure 7:
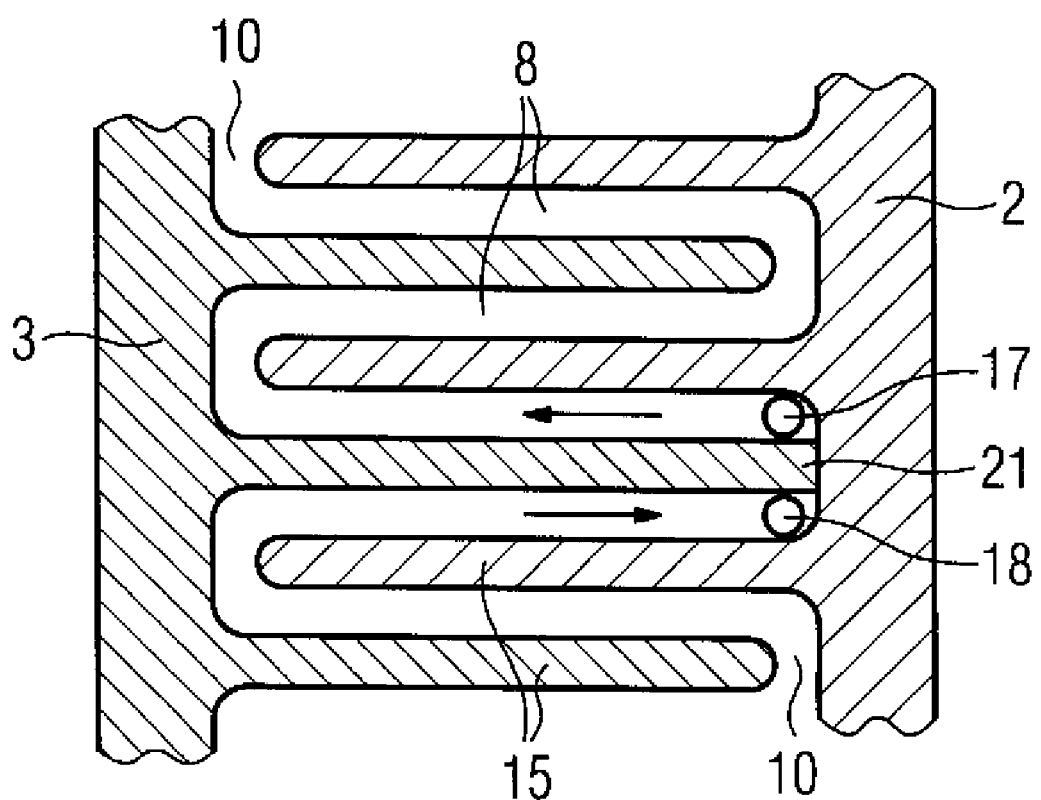
FIG. 7 is a developed view from above and sectional view thereof, partially showing the meandering configuration of the cooling path.

As shown in FIG. 2, a cooling jacket is provided by the housing parts 2 and 3 being assembled. Axial cooling channels 8 are provided by the housing parts 2, 3 being plugged together by the respective pins 15 of the housing parts 2, 3, which are arranged offset, engaging in the respective interspaces 16. The cooling channels 8 are interconnected by deflections 10, when the housing parts 2 and 3 are joined together whereby the pins 15 have an axial extent which is smaller than the axial extent of the interspaces 16 so that the pins 15 do not reach the end of the respective interspaces 16 and the coolant flow is thus conducted along a coiled path or meandering path as shown in FIG. 7.

Only two sealing points, which are to be sealed off from the outside and are sealed off by O rings 6, 7, are therefore provided. This housing 1 with an integrated cooling jacket is created in a cost-effective manner by means of diecastings. The two sealing points which are provided with the O rings 6 and 7 are preferably machined.

As an alternative to this, the cooling channels 8 can be incorporated in one or both housing parts 2, 3, for example with the cuttings being detached. It is thus also possible for cooling channels to be provided which are in the form of coils.

Figure 3:
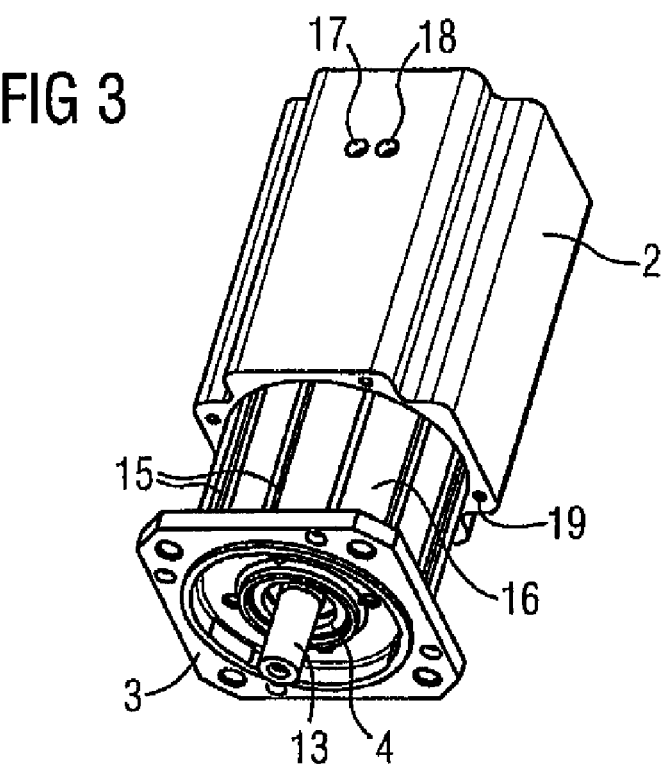
FIG. 3, FIG. 4 show perspective illustrations.

FIG. 3 shows, in a half-assembled state, the housing parts 2 and 3 during fitting. In the assembled state shown in FIG. 4, the housing parts 2 and 3 are plugged one inside the other and form the cooling channels 8 with a functional cooling jacket, which is constructed to be meandering when viewed in the circumferential direction, and its deflections 10. Aligned bores 19 are provided for screwing the housing parts 2, 3 together.

Figure 6:
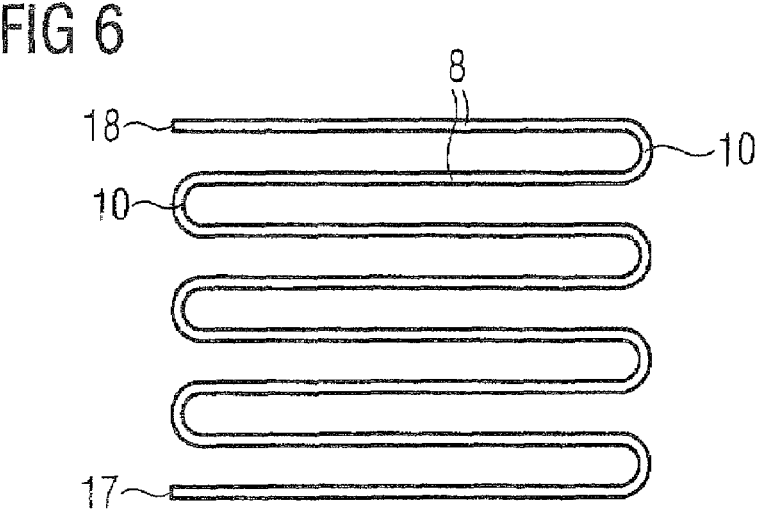
FIG. 6 shows a representation of a cooling channel as an example of a meandering cooling path formed by the housing.

The cooling liquid is passed in via the inlet 17 and out via the outlet 18. The inlet 17 and the outlet 18 are drilled holes, which are connected to the cooling channels 8 in terms of flow such that, for example, a meandering profile of the cooling channels 8 in a circumferential direction results, as shown by way of example in FIGS. 6 and 7. In this case, a pin between the inlet 17 and the outlet 18 is advantageously designed such that it has the same axial length as the interspace 16 and therefore forms a wall 21 as shown in FIG. 7. A flow short circuit between the inlet 17 and the outlet 18 is therefore avoided.

Figure 4:
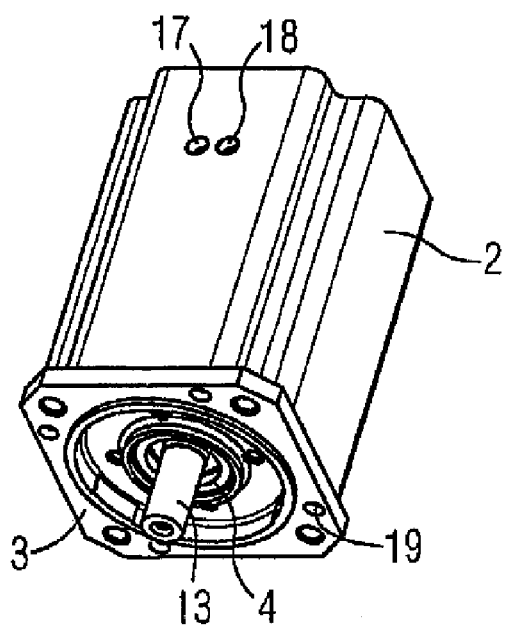

FIG. 4 shows the electrical machine in the assembled state. In this case, the housing 1 is characterized by a cross profile, with the result that the corner regions are free. Free access to the fixing screws received in respective bores 19 on the flange is therefore possible from the rear of the electrical machine. A realization of round or octagonal outer contours of the housing 1 is likewise possible, which likewise allow access to the fixing screws on the flange.

Figure 5:
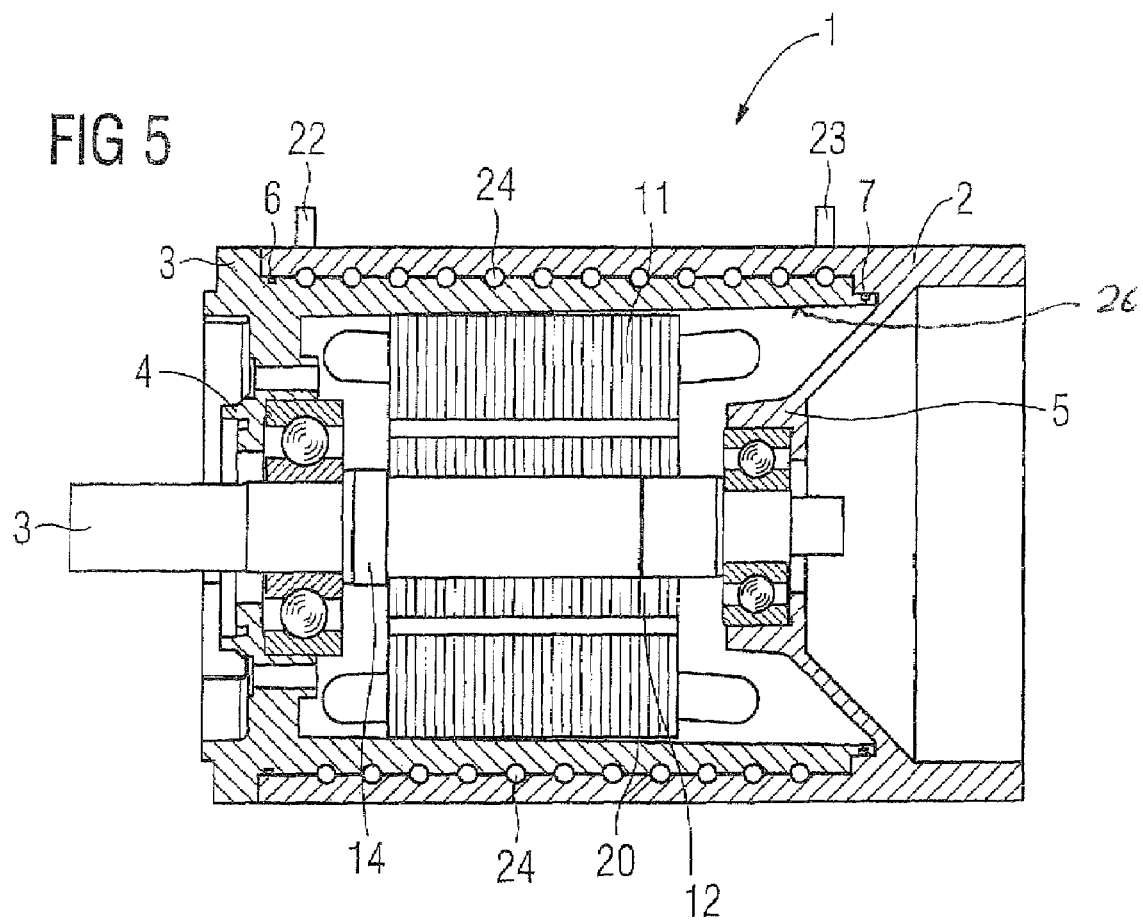
FIG. 5 shows a further longitudinal section of a housing.

FIG. 5 shows, in one further embodiment, a housing 1 according to the invention having a cooling coil 24. The cooling coil 24 has cooling liquid applied to it via its connections 22, 23. To supplement the general description of the electrical machine shown in FIG. 1, in this case cooling takes place by means of a cooling coil 24. This cooling coil 24 results according to the invention by the housing parts 2, 3 being joined together axially. In this case too, the sealing points provided between the housing parts 2 and 3 are sealed off in the pushed-together state via O rings 6 and 7. There are therefore again only two sealing points. The tube of the respective housing part 2, 3 extends axially over the stator 11, preferably even far over the respective end windings. In order to make it easier to fit the stator 12, the housing part 3 is advantageously designed to be slightly conical on its inner side 26. The cavity provided in the process can be filled by thermally conducting materials in order to maintain sufficient thermal conductivity between the housing and the stator 12.

Such a design is particularly advantageous for axially short electrical machines, in the case of which the axial length corresponds to approximately x times the diameter of the stator 11, where $0<x<5$. This applies primarily to built-in motors, in particular in the case of machine tools.

The design principle according to the invention of the two housing parts 2, 3, which are to be plugged one inside the other in the form of a tube, can also be modified in the case of air-cooled electrical machines in order to ensure a simple design and a predetermined degree of protection for the electrical machine.

What is claimed is:

1. An electrical machine, comprising:
   a housing made of two housing parts nested within one another to form a cooling jacket for flow of a coolant, each said housing part being constructed to form a bearing housing portion;
   a stator formed of stacked laminations and received in the housing;
   a rotor having a shaft; and
   a bearing unit rotatably supporting the shaft and having a first bearing seated in the bearing housing portion of one of the housing parts and a second bearing in spaced-apart relationship to the first bearing and seated in the bearing housing portion of the other one of the housing parts;
   wherein the cooling jacket includes axial cooling channels separated by pins which are sized to form deflections at respective ends of the cooling channels to thereby establish a coolant flow along a meandering path around the stator,
   wherein one of the housing parts is disposed in confronting relationship to the stacked laminations of the stator and has a conical inner side which tapers outwards to define a cavity between the one housing part and the stacked laminations of the stator for receiving a thermally conducting material to maintain sufficient thermal conductivity between the housing and the stator.

2. The electrical machine of claim 1, wherein the housing parts are made of die casting.

3. The electrical machine of claim 1, wherein the housing parts are tubular in shape to telescope into one another to form the cooling channels, and further comprising two seals for sealing the cooling jacket against the outside.

4. The electrical machine of claim 3, wherein the seals are O rings, said housing defining centering edges provided with recesses for positioning the O rings.

5. The electrical machine of claim 1, further comprising a screw connection, provided on the drive-proximal one of the bearing housing portions, for securing the housing parts together.

6. The electrical machine of claim 1, wherein one of the housing parts has an inlet for entry of coolant and an outlet for exit of coolant, said inlet and outlet being fluidly connected to the cooling channels, with one of the pins being sized to establish a wall to separate the inlet and the outlet from one another.

7. The electrical machine of claim 1, wherein the housing parts and the bearing housing portions form a single-piece construction.

* * * * *